US009758005B2

(12) United States Patent
Kanda et al.

(10) Patent No.: US 9,758,005 B2
(45) Date of Patent: Sep. 12, 2017

(54) SUSPENSION CONTROLLER (71) Applicant: HONDA MOTOR CO., LTD., Tokyo (JP)

(72) Inventors: Ryoma Kanda, Wako (JP); Yukihiro Orimoto, Wako (JP); Koichi Shibusawa, Wako (JP); Tomohiro Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/139,752

(22) Filed: Apr. 27, 2016

(65) Prior Publication Data
US 2016/0318364 A1 Nov. 3, 2016

(30) Foreign Application Priority Data

Apr. 28, 2015 (JP) .................. 2015-091221

(51) Int. Cl.
*B60G 17/08* (2006.01)
*B60G 17/016* (2006.01)
*B60G 17/019* (2006.01)

(52) U.S. Cl.
CPC ..... *B60G 17/016* (2013.01); *B60G 17/01933* (2013.01); *B60G 17/08* (2013.01); *B60G 2202/24* (2013.01); *B60G 2400/208* (2013.01); *B60G 2500/10* (2013.01); *B60G 2600/18* (2013.01); *B60G 2800/162* (2013.01)

(58) Field of Classification Search
CPC .............. B60G 17/0152; B60G 17/08; B60G 17/01933; B60G 17/016; B60G 2800/162; B60G 2400/208; B60G 2500/10; B60G 2600/18; B60G 2202/24
See application file for complete search history.

(56) References Cited

U.S. PATENT DOCUMENTS 4,749,210 A * 6/1988 Sugasawa .......... B60G 17/0165
280/124.102
5,365,432 A * 11/1994 Kakizaki ............. B60G 17/018
280/5.504

(Continued)

FOREIGN PATENT DOCUMENTS

| JP | 06055919 A | * | 3/1994 |
| JP | 2011225040 A | * | 11/2011 |
| WO | 2013/115006 A1 | | 8/2013 |

*Primary Examiner* — Rodney Butler
(74) *Attorney, Agent, or Firm* — Westerman, Hattori, Daniels & Adrian, LLP (57) ABSTRACT

A suspension controller includes a wheel speed sensor that detects the wheel speed of each wheel, a basic input amount calculating unit that calculates the basic input amount of the vehicle on the basis of a wheel speed variation detected by the wheel speed sensor, a state amount calculating unit that calculates the state amount of the vehicle by inputting the basic input amount to a vehicle model representing the motion of the vehicle, and a damper controlling unit that controls the damping force of a damping-force-variable damper on the basis of the calculated state amount. If the wheel speed variation detected by the wheel speed sensor decreases below zero by a predetermined value or more on the minus side, the vertical load of the wheel is considered to be decreased, and the damping force is controlled to be greater than before the decrease.

3 Claims, 12 Drawing Sheets

(56) References Cited

U.S. PATENT DOCUMENTS

| | | | | |
|---|---|---|---|---|
| 8,428,819 | B2* | 4/2013 | Moshchuk | B60G 17/08 701/1 |
| 9,061,561 | B2* | 6/2015 | Kikuchi | B60T 8/17555 |
| 2005/0021205 | A1* | 1/2005 | Niwa | B60G 17/016 701/37 |
| 2007/0029711 | A1* | 2/2007 | Ehara | B60G 17/08 267/64.28 |
| 2014/0005889 | A1* | 1/2014 | Hayakawa | B60G 17/01933 701/38 |
| 2015/0066295 | A1* | 3/2015 | Kanda | B60G 17/06 701/38 |
| 2015/0290995 | A1* | 10/2015 | Kanda | B60G 17/0161 701/37 |

* cited by examiner

SUSPENSION CONTROLLER

CROSS REFERENCES TO RELATED APPLICATIONS

The present application claims priority under 35 U.S.C. §119 to Japanese Patent Application No. 2015-091221, filed Apr. 28, 2015, entitled "Suspension Controller." The contents of this application are incorporated herein by reference in their entirety.

BACKGROUND

1. Field

The present disclosure relates to suspension controllers of vehicles having damping-force-variable dampers that can adjust damping force in response to input signals.

2. Description of the Related Art

For example, International Publication No. 2013/115006 discloses a vehicle controller controlling the attitude of a vehicle without expensive sensors, such as a sprung vertical acceleration sensor and a stroke sensor. This vehicle controller estimates a sprung speed on the basis of a wheel speed and calculates the controlled variable of each of plural actuators for achieving a target attitude.

SUMMARY

The ride comfort of a vehicle is improved by, for example, skyhook control that estimates a vertical state amount of the vehicle required for variable damper control on the basis of a wheel speed signal. Unfortunately, this controlling method is difficult to estimate the absolute amount of a suspension stroke or estimates the absolute amount with low calculating accuracy, such that, for example, the damping force cannot be accurately controlled to be increased in approaching full stroke.

A controlling system including a stroke sensor can control the damping force of the suspension to be increased with the suspension stroke value detected by the stroke sensor in approaching full stroke.

In contrast, since related-art controlling systems without stroke sensors cannot perform the above-mentioned control, a shock of full rebound or thrusting-up by full bump after full rebound causes shock acceleration and shock noise. This provides discomfort to a person in the vehicle and decreases ride comfort and marketability.

The present application describes a suspension controller that can improve ride comfort without an expensive sensor, such as a stroke sensor.

The present disclosure provides a suspension controller of a vehicle having a damping-force-variable damper that can adjust damping force in response to an input signal, the suspension controller including a wheel speed sensor that detects the wheel speed of each wheel, a basic input amount calculating unit that calculates the basic input amount of the vehicle on the basis of a wheel speed variation detected by the wheel speed sensor, a state amount calculating unit that calculates the state amount of the vehicle by inputting the basic input amount to a vehicle model representing the motion of the vehicle, and a damper controlling unit that controls the damping force of a damping-force-variable damper on the basis of the calculated state amount. If the wheel speed variation detected by the wheel speed sensor decreases below zero by a predetermined value or more on the minus side, the damper controlling unit controls the damping force to be greater than before the decrease in the wheel speed variation by the predetermined value or more.

According to the present disclosure, a control system without an expensive sensor, such as a stroke sensor, directs attention on wheel speed variations in substantially proportional relations with vertical load variations, considers a wheel speed variation decreasing below zero by a predetermined value or more on the minus side as a decrease in the vertical load of the wheel, and controls the damping force to be greater than before the decrease in the wheel speed variation by the predetermined value or more. This control in the present disclosure can reduce shock acceleration and shock noise in full stroke (full rebound) of the suspension.

According to the present disclosure, a reactive shock after the vehicle passes a road bump that may cause full stroke (full rebound) of the suspension can be promptly converged. This provides a suspension controller that can improve ride comfort without an expensive sensor.

Preferably, in the present disclosure, if the wheel speed variation goes below a threshold being the predetermined value, the peak of the damping force is held in correspondence with a waveform signal below the threshold.

According to the present disclosure, the difference in the wheel speed variation between the threshold and a bottom below the threshold of a wheel speed variation characteristic curve is calculated. If the difference in the wheel speed variation is relatively large, the peak of the damping force to be held is set large. If the difference in the wheel speed variation is relatively small, the peak of the damping force to be held is set small. This control in the present disclosure can stably reduce a shock of full rebound and prevent vibration of the sprung component in landing.

Preferably, in the present disclosure, the period for holding the peak is adjusted in correspondence with the amount of the wheel speed variation below the threshold.

According to the present disclosure, since a large variation in the vertical load on the wheel (a large wheel speed variation) increases the motion of the sprung component (vehicle body), an appropriate adjustment of the peak holding period can further prevent vibration of the sprung component (vehicle body).

Preferably, in the present disclosure, a control gain is adjusted in correspondence with the amount of the wheel speed variation below a threshold being the predetermined value.

According to the present disclosure, since a large variation in the vertical load on the wheel (a large wheel speed variation) increases the motion of the sprung component (vehicle body), an appropriate adjustment of the control gain G can further prevent vibration of the sprung component (vehicle body).

Preferably, in the present disclosure, if the wheel speed variation goes below a threshold being the predetermined value continuously plural times, the threshold is adjusted for the second time and after relative to the threshold for the first time, or a control gain is increased for the second time and after from a control gain for the first time.

According to the present disclosure, if the wheel speed variation goes below the threshold being the predetermined value continuously plural times, the damping force for the first time may be controlled by increasing the control gain or adjusting the threshold for prompt control for the second time and after, assuming that a reduction in a shock of full rebound is insufficient. This control in the present disclosure can effectively reduce a shock of full rebound and prevent vibration of the sprung component in landing. The word "unit" used in this application may mean a physical part or component of computer hardware including a controller, a processor, a memory, etc., which is configured to perform intended functions, as disclosed herein.

DESCRIPTION OF THE PREFERRED EMBODIMENTS

Figure 1:
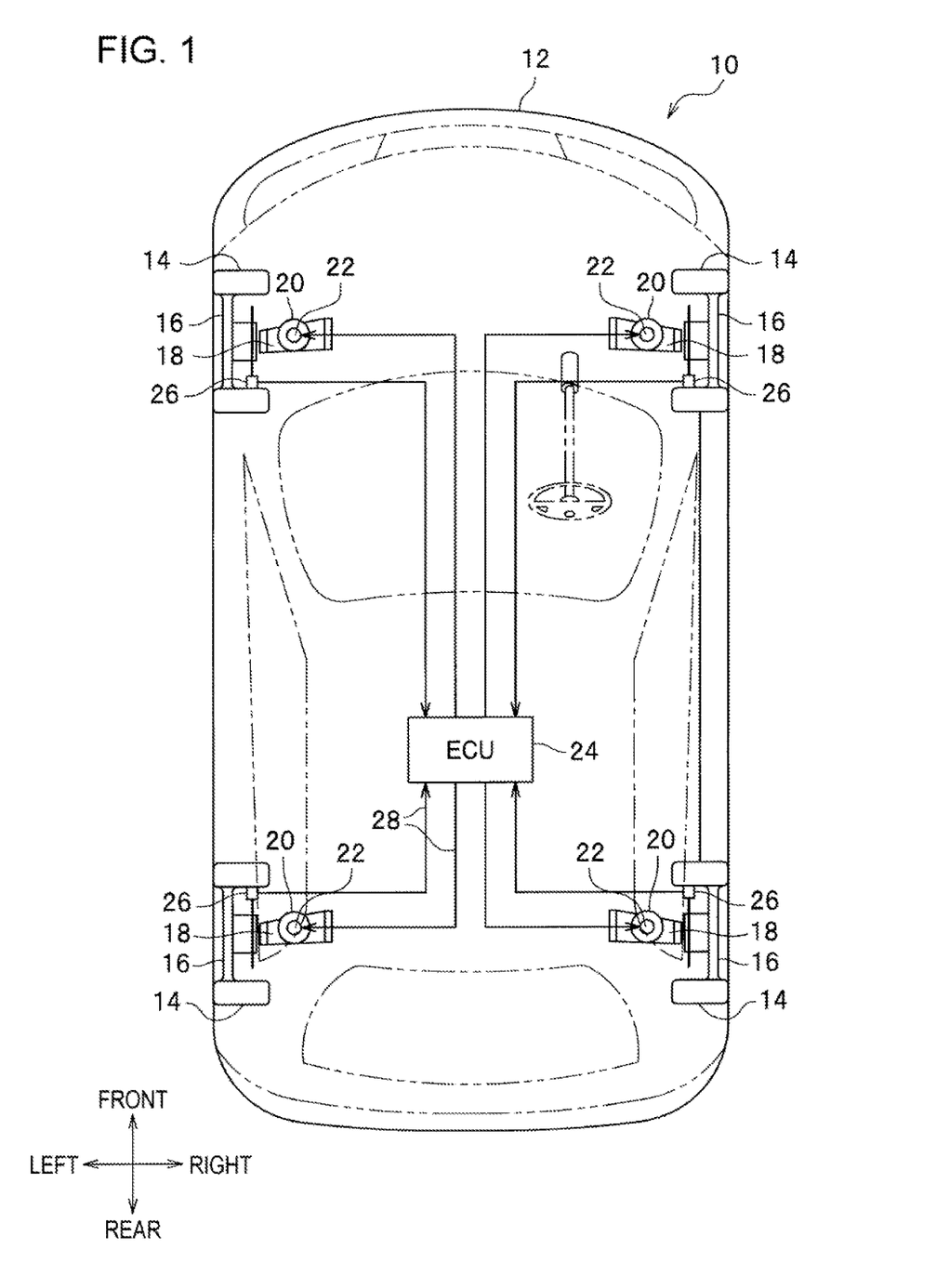
FIG. 1 is a schematic view of a vehicle including a suspension controller according to an embodiment of the present disclosure.
Figure 2:
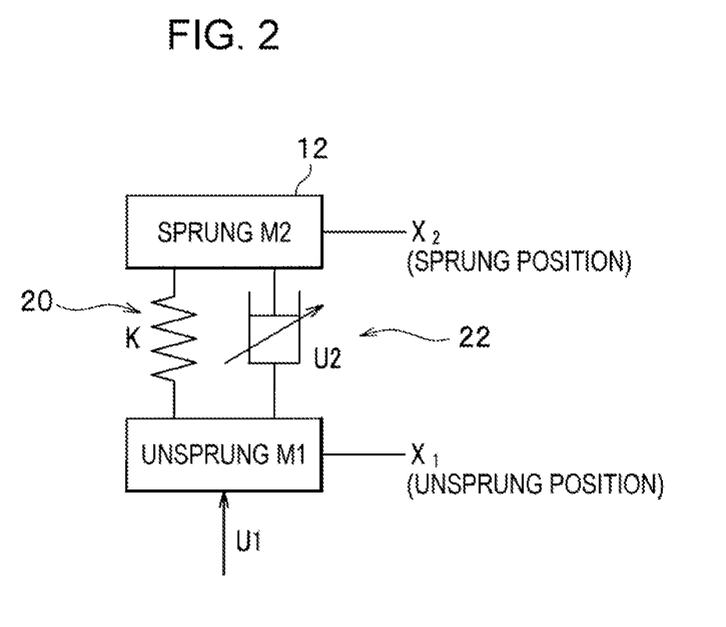
FIG. 2 is a schematic view of a suspension in FIG. 1.
Figure 3:
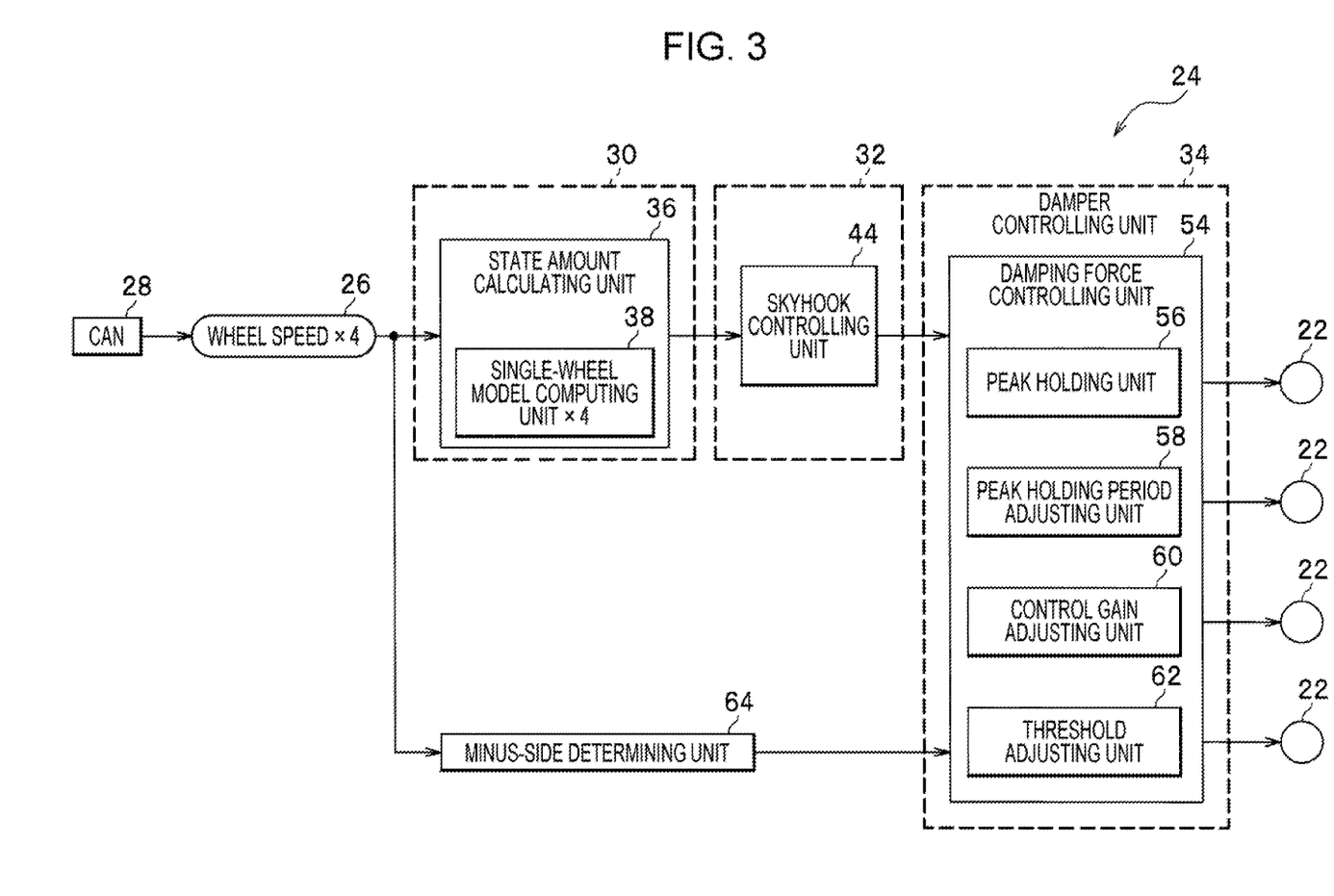
FIG. 3 is a schematic block diagram of the suspension controller according to an embodiment of the present disclosure.
Figure 4:
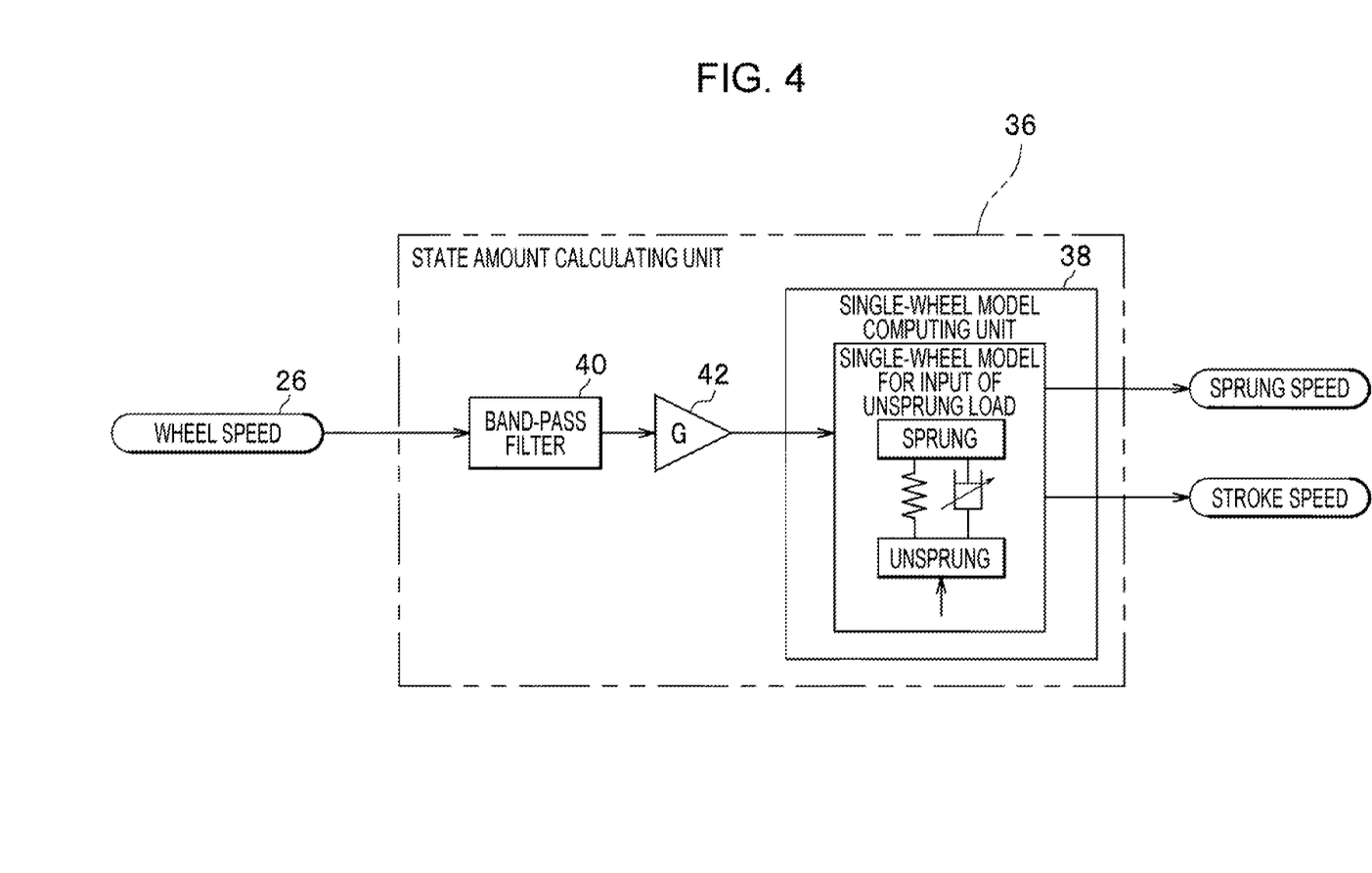
FIG. 4 is a block diagram of a state amount calculating unit in FIG. 3.

Embodiments of the present disclosure will now be described in detail with reference to the attached drawings. FIG. 1 is a schematic view of a vehicle including a suspension controller according to an embodiment of the present disclosure. FIG. 2 is a schematic view of the suspension in FIG. 1. FIG. 3 is a schematic block diagram of the suspension controller according to an embodiment of the present disclosure. FIG. 4 is a block diagram of the state amount calculating unit in FIG. 3.

With reference to FIGS. 1 and 2, a vehicle 10 has a vehicle body 12 provided with four wheels 16 that are disposed at the front, rear, right, and left of the vehicle body 12 and have tires 14 mounted thereon. Each wheel 16 is suspended from the vehicle body 12 via a suspension composed of a suspension arm 18, a spring 20, a damping-force-variable damper 22 (hereinafter referred to as a damper 22), and the like. The vehicle 10 includes an electronic control unit (ECU) 24 for performing various types of control and wheel speed sensors 26, disposed at the respective wheels, for detecting the wheel speed V of the wheels 16. Each of the wheel speed sensors 26 detects the rotational speed of the corresponding wheel 16 as a detection signal (also referred to as a wheel speed signal). The vehicle 10 may be a front-wheel-drive, rear-wheel-drive, or four-wheel-drive vehicle.

The ECU 24 is composed of a microcomputer, ROM, RAM, a peripheral circuit, an input/output interface, various drivers, and the like. The ECU 24 is electrically connected to the dampers 22 and the wheel speed sensors 26 of the wheels 16 via communication lines (a controller area network (CAN) 28 in this embodiment). The ECU 24 and the wheel speed sensors 26 are included in a suspension controller.

In this embodiment, the dampers 22 are of a mono-tube (De Carbon) type, for example. In each damper 22, a piston rod is accommodated in a cylinder filled with a magneto-rheological fluid (MRF) so as to slide axially, and a piston mounted at the tip of the piston rod divides the interior of the cylinder into an upper oil chamber and a lower oil chamber. A communicating channel for communication between the upper oil chamber and the lower oil chamber is disposed between the upper oil chamber and the lower oil chamber. An MLV coil is disposed inside the communicating channel.

The damper 22 is, for example, connected to the suspension arm 18, being a wheel-side member, at the lower end of the cylinder and to a damper base, being a vehicle-body-side member, at the upper end of the piston rod. With reference to FIG. 2, each damper 22 connects unsprung components (movable components, including the wheel 16, a knuckle, and the suspension arm 18, below the suspension) having mass M1 to a sprung component including the vehicle body 12 and having mass M2, together with the spring 20.

Current supplied from the ECU 24 to the MLV coil (not illustrated) of the damper 22 applies a magnetic field to the MRF flowing through the communicating channel, resulting in the formation of chain clusters by ferromagnetic particles. This formation raises the apparent viscosity of the MRF passing through the communicating channel and thus increases the damping force of the damper 22.

A description will now be given with reference to the block diagram in FIG. 3.

The ECU 24 includes the wheel speed sensors 26 electrically connected to the CAN 28, a vehicle state amount estimating unit 30 that estimates the vertical state amount of the vehicle 10 from the detection signals from the wheel speed sensors 26, a control target current setting unit 32 that sets the control target current of each damper 22 to improve the handling and stability and ride comfort of the vehicle 10 on the basis of values calculated by the vehicle state amount estimating unit 30 and the detection signal from the wheel speed sensors 26, and a damper controlling unit 34 that controls the damping force of each damper 22 by generating driving current to be supplied to the damper 22 on the basis of the control target current set by the control target current setting unit 32.

The wheel speed signals output from the wheel speed sensors 26 of the wheels 16 are received by a state amount calculating unit 36 of the vehicle state amount estimating unit 30. The damping force is controlled for the right and left front wheels and then for the right and left rear wheels with a predetermined time lag therebetween. The damping force for the left and right front wheels is controlled on the basis of the larger one of the amounts of damping for the wheels. This control allows the state amount calculating unit 36 to select the larger one of wheel speed variations of the right and left front wheels, and single-wheel model computing units 38, which will be described later, perform computations on the basis of the selected wheel speed variation.

The vehicle state amount estimating unit 30 estimates the state amount of the vehicle 10 on the basis of certain correlations between wheel speed variations and vertical loads on the wheels 16 on a road. The vehicle state amount estimating unit 30 includes the state amount calculating unit 36 that estimates various state amounts of the vehicle 10 for each wheel 16 with vehicle models on the basis of the detection values from the wheel speed sensors 26. The state amount calculating unit 36 includes the single-wheel model computing units 38 for the respective four wheels that are disposed at the front, rear, right, and left.

The state amount calculating unit 36 will now be described in detail.

With reference to FIG. 4, in the state amount calculating unit 36, the wheel speed signal output from each of the wheel speed sensors 26 is received by a gain circuit 42 via a band-pass filter 40. The band-pass filter 40 has, for example, such band-pass characteristics as to transmit frequency components of 0.5 to 5 Hz. In this embodiment, the CAN 28 is used as communication lines, and the wheel speed signals are received with updating cycles of approximately 10 to 20 msec. The band-pass filter 40 thus functions as a low-pass filter that transmits a band of lower than approximately 5 Hz to block high-frequency components and to reliably extract frequency components in a sprung resonance band (signals in a frequency range corresponding to sprung vibration). If the wheel speed signals are received with shorter updating cycles, a band-pass filter 40 for a high band of approximately 20 Hz, for example, may be used to also extract frequency components in an unsprung resonance band.

The gain circuit 42 uses proportional relations between wheel speed variations and unsprung loads U1 (vertical loads) to calculate an unsprung load (vertical load) on the basis of the wheel speed variation of each wheel 16. That is, the gain circuit 42 multiplies the wheel speed variation by a constant k of proportionality to calculate the vertical load of the wheel 16. This indicates that the gain circuit 42 functions as a basic input amount calculating unit that calculates the unsprung load (vertical load) being a basic input amount of the vehicle 10 on the basis of the wheel speed variation.

The unsprung load (vertical load) output from the gain circuit 42 is received by a single-wheel model included in the single-wheel model computing unit 38. The single-wheel model computing unit 38 inputs the unsprung load to the single-wheel model to compute and output the state amount of the vehicle 10 including the sprung speed and suspension stroke speed used for calculation at a skyhook controlling unit 44, which will be described later. That is, the single-wheel model functions as a state amount calculating unit that calculates various state amounts of the vehicle 10 with the wheel speed valuations as external force.

Figure 5:
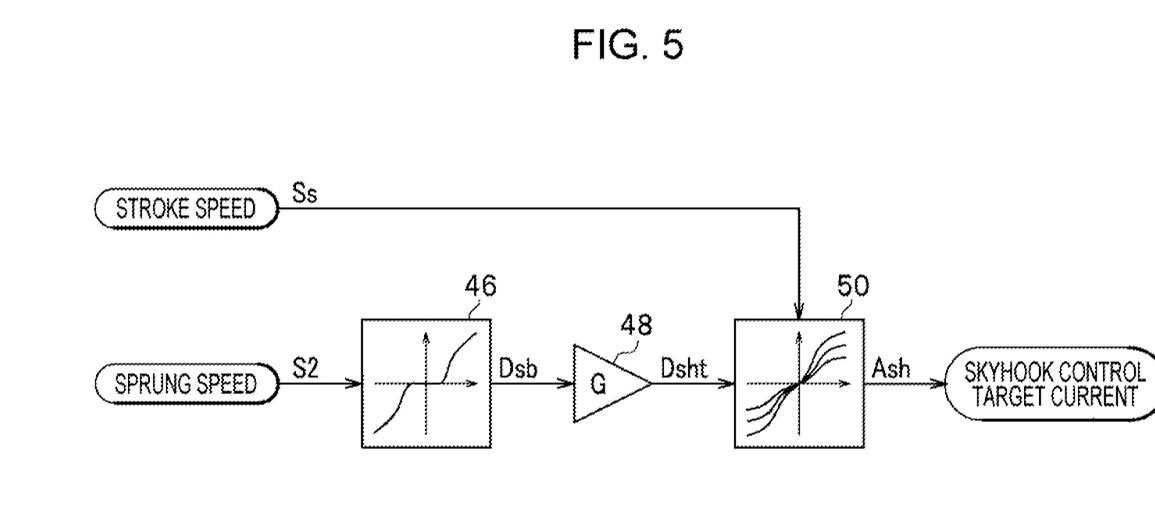
FIG. 5 is a block diagram of a skyhook controlling unit in FIG. 3.
Figure 6:
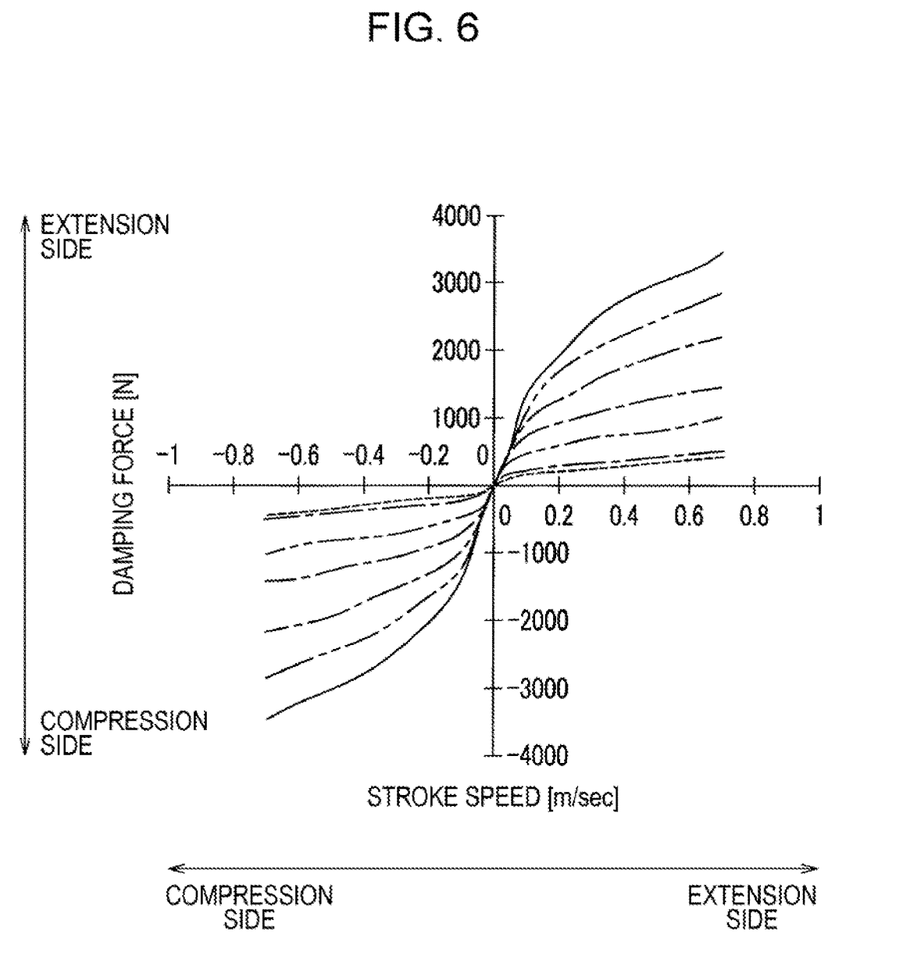
FIG. 6 is a target current map used by a target current setting circuit in FIG. 5.

The control target current setting unit 32 includes the skyhook controlling unit 44. The skyhook controlling unit 44 performs skyhook control for setting skyhook control target current. FIG. 5 is a block diagram of the skyhook controlling unit in FIG. 3. FIG. 6 is a target current map used by the target current setting circuit in FIG. 5. The processing at the skyhook controlling unit 44 will now be described in detail with reference to FIG. 5.

In the skyhook controlling unit 44, the sprung speed calculated by the state amount calculating unit 36 is received by a damping force base value calculating unit 46. The damping force base value calculating unit 46 refers to a sprung damping force map to calculate a damping force base value on the basis of the received sprung speed. The calculated damping force base value is received by a gain circuit 48. The gain circuit 48 multiplies the damping force base value by skyhook gain to calculate skyhook target damping force. The calculated skyhook target damping force is received by a target current setting circuit 50. The target current setting circuit 50 also receives a stroke speed Ss. The target current setting circuit 50 refers to a current map (0 A to 6 A) in FIG. 6 to set skyhook control target current for each damper 22 on the basis of the skyhook target damping force and the stroke speed Ss and outputs the skyhook control target current.

With reference to FIG. 3, the damper controlling unit 34 includes a damping force controlling unit 54 that controls the damping force of the suspension. The damping force controlling unit 54 includes a peak holding unit 56 that holds increased damping force at a predetermined peak value, a peak holding period adjusting unit 58 that adjusts the peak holding period of the damping force, a control gain adjusting unit 60 that adjusts control gain G, and a threshold adjusting unit 62 that adjusts the threshold of the damping force.

The ECU 24 includes a minus-side determining unit 64 that receives wheel speed signals detected by the wheel speed sensors 26. The minus-side determining unit 64 calculates a wheel speed variation per unit time on the basis of the wheel speed signals from each of the wheel speed sensors 26 and determines whether the wheel speed variation decreases below zero by a predetermined value or more on the minus side. If determining that the wheel speed variation decreases below zero by the predetermined value or more, the minus-side determining unit 64 outputs a control signal to the damping force controlling unit 54 so that the damping force of the suspension is controlled to be greater than before the decrease in the wheel speed variation by the predetermined value or more. This will be described in detail later.

The vehicle 10 including the suspension controller according to this embodiment basically has the above configuration. Advantageous effects of the suspension controller will now be described.

Figure 7A:
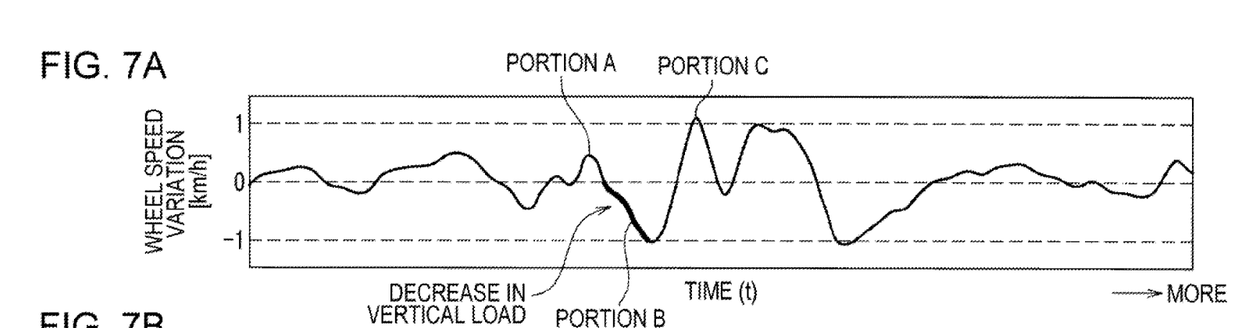
FIG. 7A is a characteristic diagram of correlations between time (t) indicated by the horizontal axis and wheel speed variations (km/h) indicated by the vertical axis.
Figure 7B:
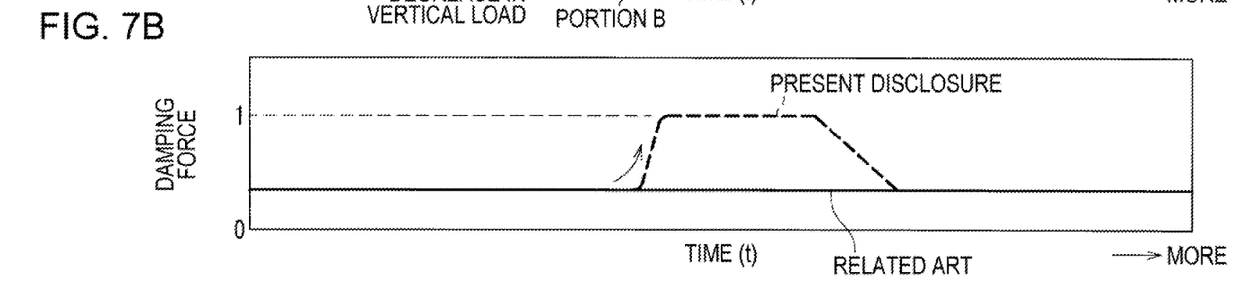
FIG. 7B is a characteristic diagram of correlations between time (t) indicated by the horizontal axis and damping force indicated by the vertical axis.
Figure 7C:
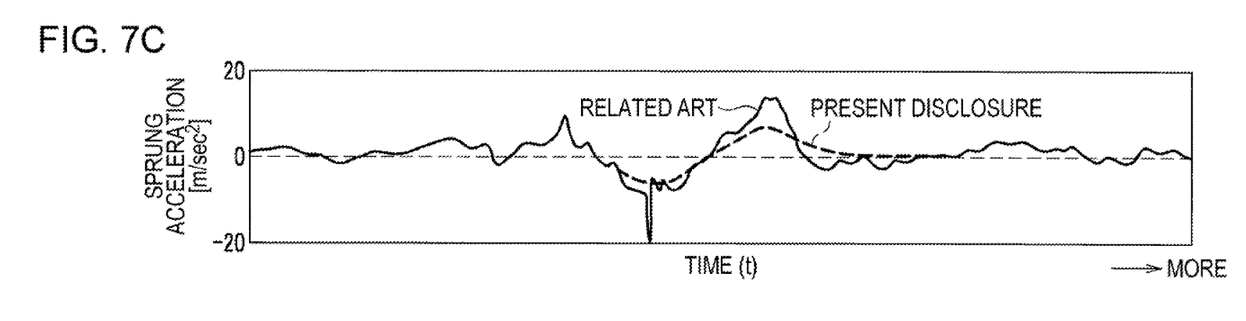
FIG. 7C is a characteristic diagram of correlations between time (t) indicated by the horizontal axis and sprung acceleration (m/sec$^2$) indicated by the vertical axis.

The basic principle of the present disclosure will now be described with reference to FIGS. 7A to 7C. FIG. 7A is a characteristic diagram of correlations between time (t) indicated by the horizontal axis and wheel speed variations (km/h) indicated by the vertical axis, FIG. 7B is a characteristic diagram of correlations between time (t) indicated by the horizontal axis and damping force indicated by the vertical axis, and FIG. 7C is a characteristic diagram of correlations between time (t) indicated by the horizontal axis and sprung acceleration (m/sec$^2$) indicated by the vertical axis.

The present disclosure calculates a wheel speed variation per unit time on the basis of the wheel speed V detected by each of the wheel speed sensors 26. If the wheel speed variation decreases below zero by the predetermined value or more on the minus side, the vertical load of the corresponding wheel 16 is considered to be decreased, and the damping force of the suspension is controlled to be greater than before the decrease in the wheel speed variation by the predetermined value or more. That is, it has been found that wheel speed variations and vertical loads have substantially proportional relations, and accordingly the present disclosure simplifies suspension control by considering decreases in wheel speed variations as decreases in vertical loads on wheels without conversion (computation) from wheel speed variations into vertical loads used in related-art control.

Figure 8A:
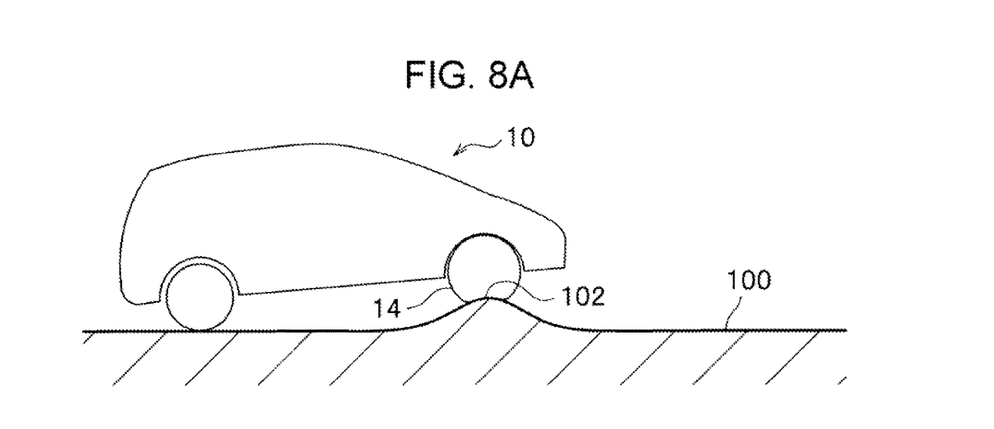
FIG. 8A illustrates a right front wheel that is running on a bump in a road.

Specific description will now be given with reference to FIGS. 8A to 8C. FIG. 8A illustrates a right front wheel that is running on a bump in a road, FIG. 8B illustrates the right front wheel that has passed over the bump in the road and then is in full rebound, and FIG. 8C illustrates the right front wheel that lands on the road after the full rebound.

After the vehicle 10 starts normal travel, the ECU 24 performs normal damping force control (skyhook control) of the suspension at predetermined processing intervals (of 10 ms, for example). With reference to FIG. 8A, if the right front wheel runs on a bump 102 in a road 100 during the skyhook control, for example, pressing force from the bump 102 in the road 100 deforms the tire 14 into a concave toward the center and causes a compression stroke in the suspension into full bump or a state approximate to full bump. When the tire 14 is on the bump 102 in the road 100, the wheel speed variation increases above zero on the plus side (see the portion A in FIG. 7A).

Figure 8B:
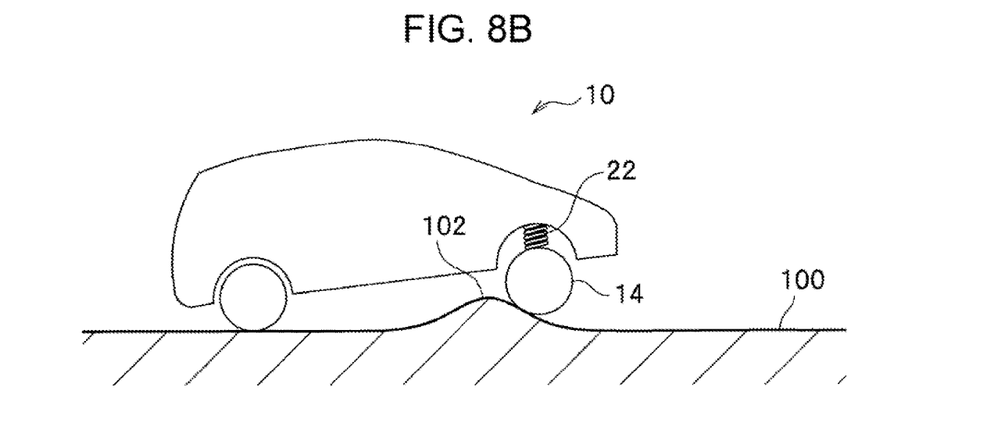
FIG. 8B illustrates the right front wheel that has passed over the bump in the road and then is in full rebound.
Figure 8C:
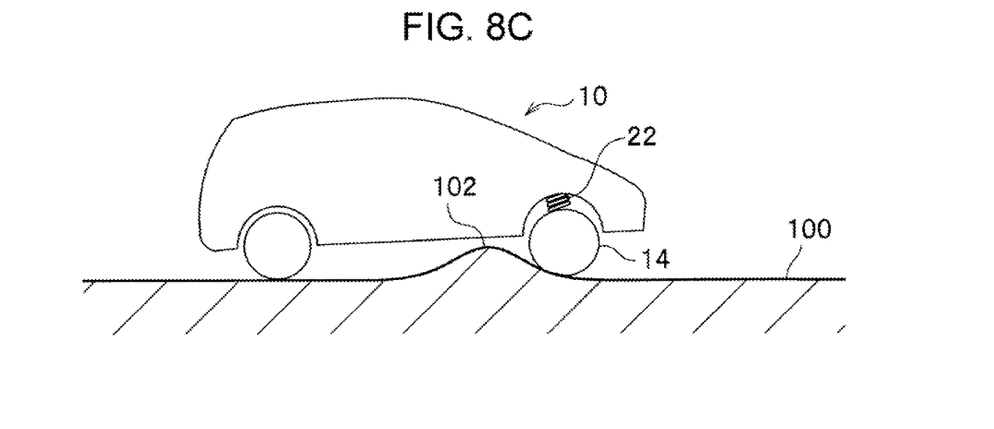
FIG. 8C illustrates the right front wheel that lands on the road after the full rebound.

With reference to FIG. 8B, if the right front wheel has passed over the bump 102 and then is in full rebound with the tire 14 slightly contacting the road, the wheel speed variation decreases below zero by the predetermined value or more (see the portion B represented by the thick solid line in FIG. 7A). At this time, the minus-side determining unit 64 determines that the wheel speed variation detected by the wheel speed sensor 26 varies below zero by the predetermined value or more on the minus side. The minus-side determining unit 64 considers the vertical load on the wheel 16 on the road 100 to be decreased on the basis of the determination and outputs a control signal to the damping force controlling unit 54. The damping force controlling unit 54 controls the damping force of the suspension to be greater than before the decrease in the wheel speed variation by the predetermined value or more (see the thick dashed line in FIG. 7B). In this embodiment, the increase in the damping force before reaching full rebound (stroke end) can reduce a shock of the full rebound and a shock of full bump after the full rebound. The portion C in FIG. 7A represents an increase in the vertical load due to full bump after the full rebound.

That is, in this embodiment, a decrease in the vertical load of the wheel 16 increases the damping force of the suspension. This increase causes the piston rod of the damper 22 to be less prone to be pulled downward and thus allows the suspension arm 18 to slightly contact a rebound stopper (not illustrated), resulting in a reduction in a shock of full rebound and shock noise. In this embodiment, the damping force is maintained at the level increased when the right front wheel has passed over the bump 102 and lands on the road 100, and the vehicle body 12 can thus go down and up slowly, resulting in an improved convergence in the motion of the sprung component after the landing. This configuration provides a suspension controller that can improve ride comfort without an expensive sensor, such as a stroke sensor.

In contrast, in related-art suspension control without a stroke sensor, a right front wheel passes over a bump 102, and the self-weight of the wheel 16 then generates shock acceleration, causing full rebound with the stroke of the suspension extending at the maximum. In the full rebound, the suspension arm 18 contacts a full rebound stopper (not illustrated), resulting in generation of shock acceleration and loud contact noise due to the full rebound. In such related-art suspension control without a stroke sensor, when the wheel 16 lands on the road 100 after the full rebound, the sprung component is raised, increasing a reactive shock. This may cause hunting.

In this embodiment, when the wheel speed variation decreases below zero by the predetermined value or more on the minus side, the damping force is controlled to be increased. This control can prevent a sudden decrease in sprung acceleration due to a decrease in the vertical load of the wheel 16 and a significant increase in sprung acceleration after the decrease in the vertical load (see the thick dashed line in FIG. 7C). Accordingly, this embodiment prevents a significant decrease and increase in sprung acceleration and yields characteristics of gradual sprung acceleration (see the thick dashed line in FIG. 7C). The thick solid lines relative to the thick dashed lines in FIGS. 7B and 7C represent related-art suspension control without a stroke sensor.

In this way, this embodiment reduces shock acceleration and shock noise due to full rebound and improves a convergence in the motion of the sprung component after the wheel 16 passes over the bump 102 and lands on the road 100.

First to fourth examples of control of the damping force will now be described.

Figure 9A:
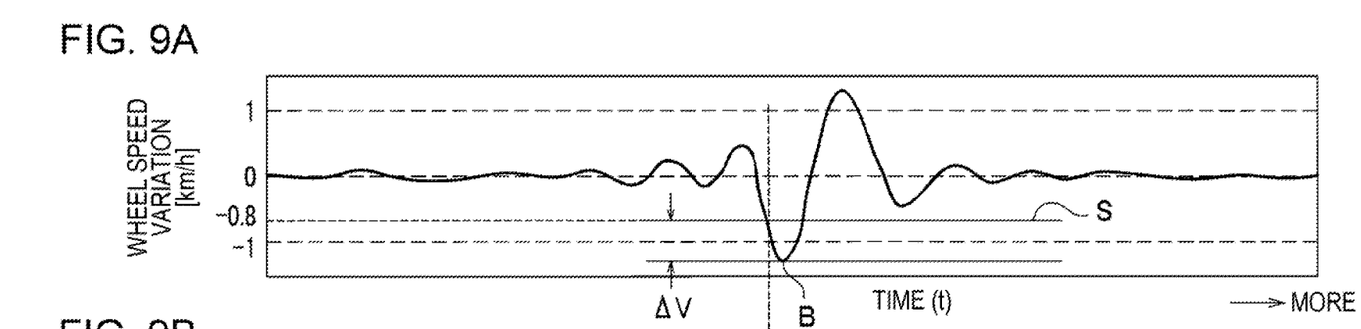
FIGS. 9A and 9B are characteristic diagrams of a first example of control of the damping force.
Figure 9B:
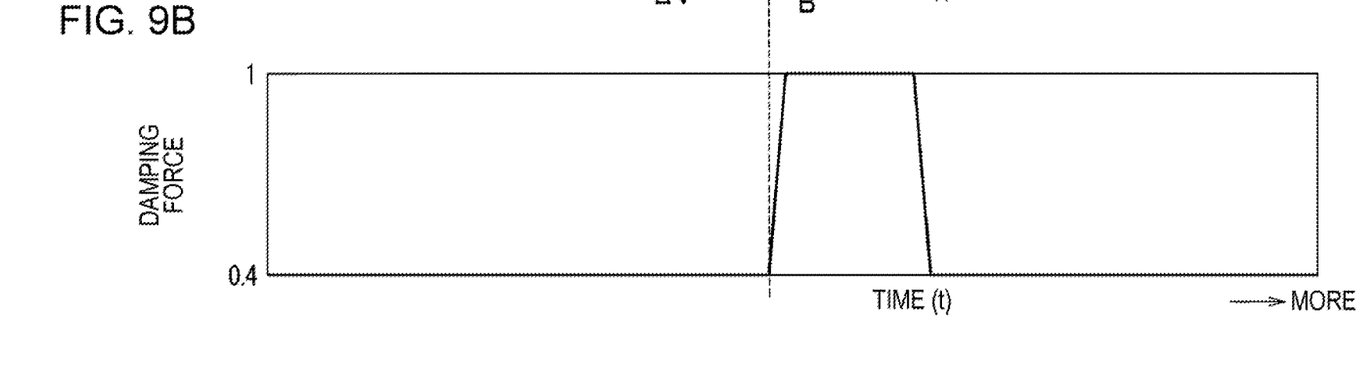
Figure 10A:
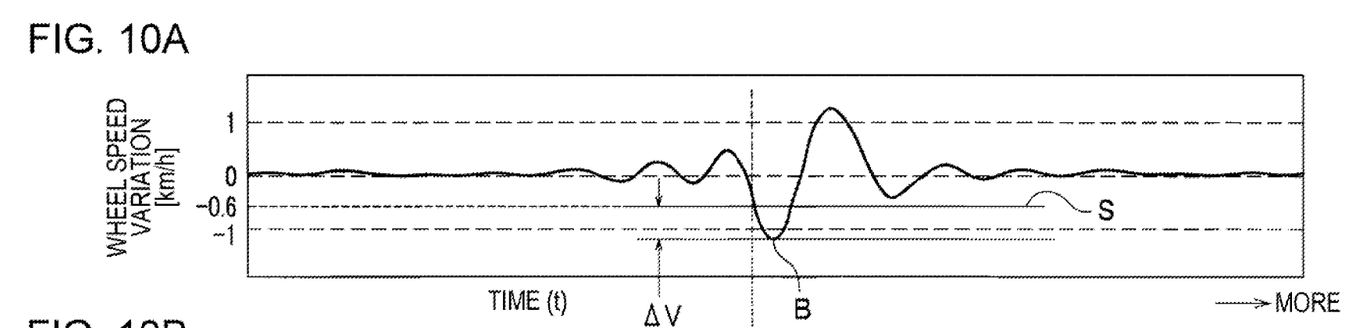
FIGS. 10A and 10B are characteristic diagrams of a second example of control of the damping force.
Figure 10B:
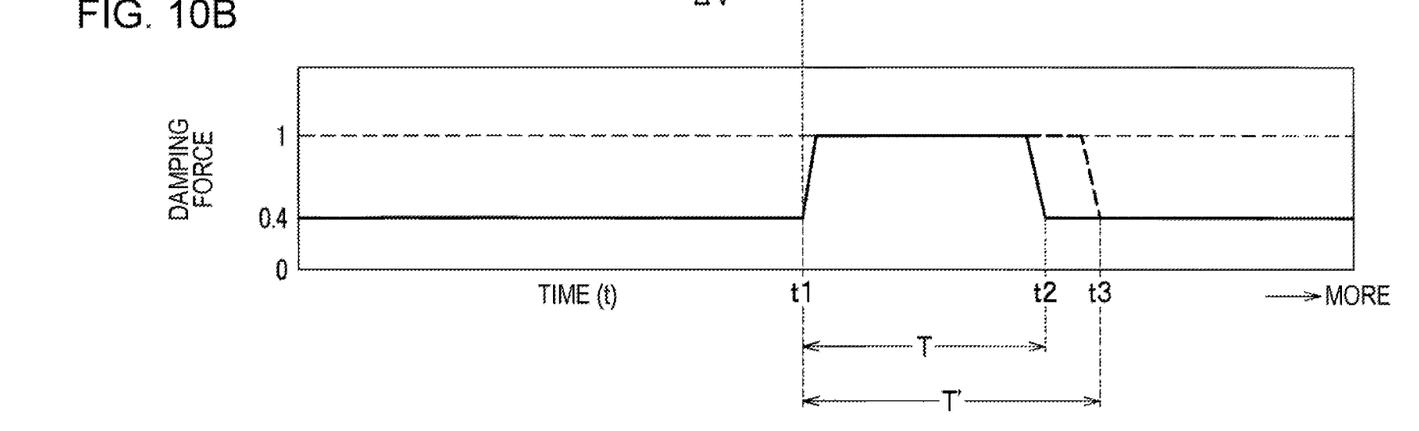
Figure 11A:
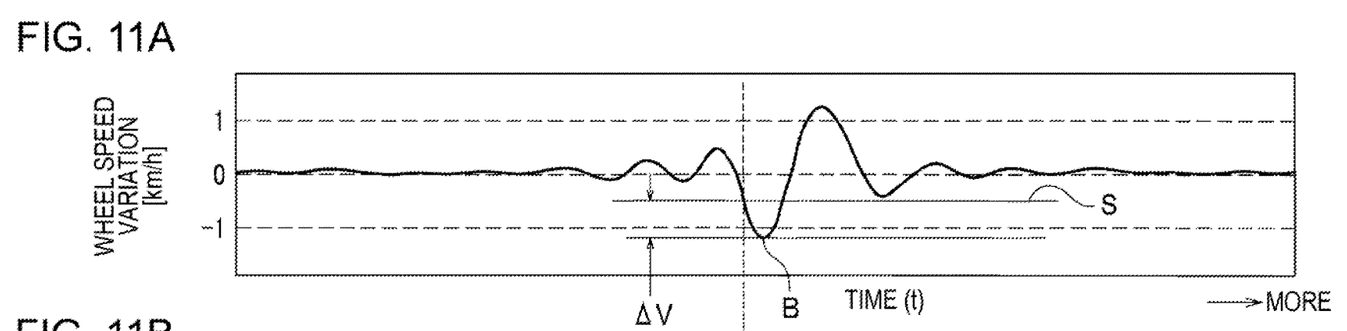
FIGS. 11A and 11B are characteristic diagrams of a third example of control of the damping force.
Figure 11B:
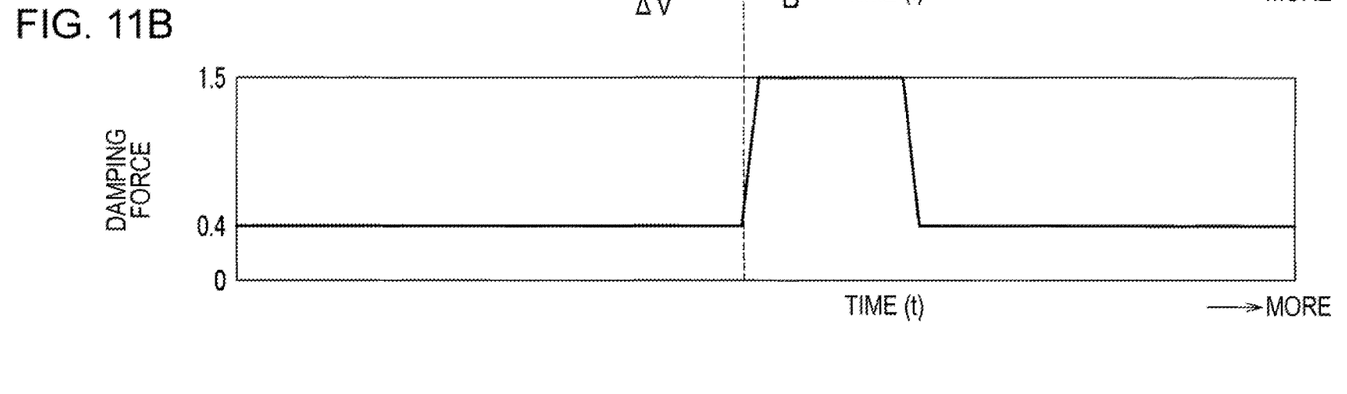
Figures 12A, 12B:
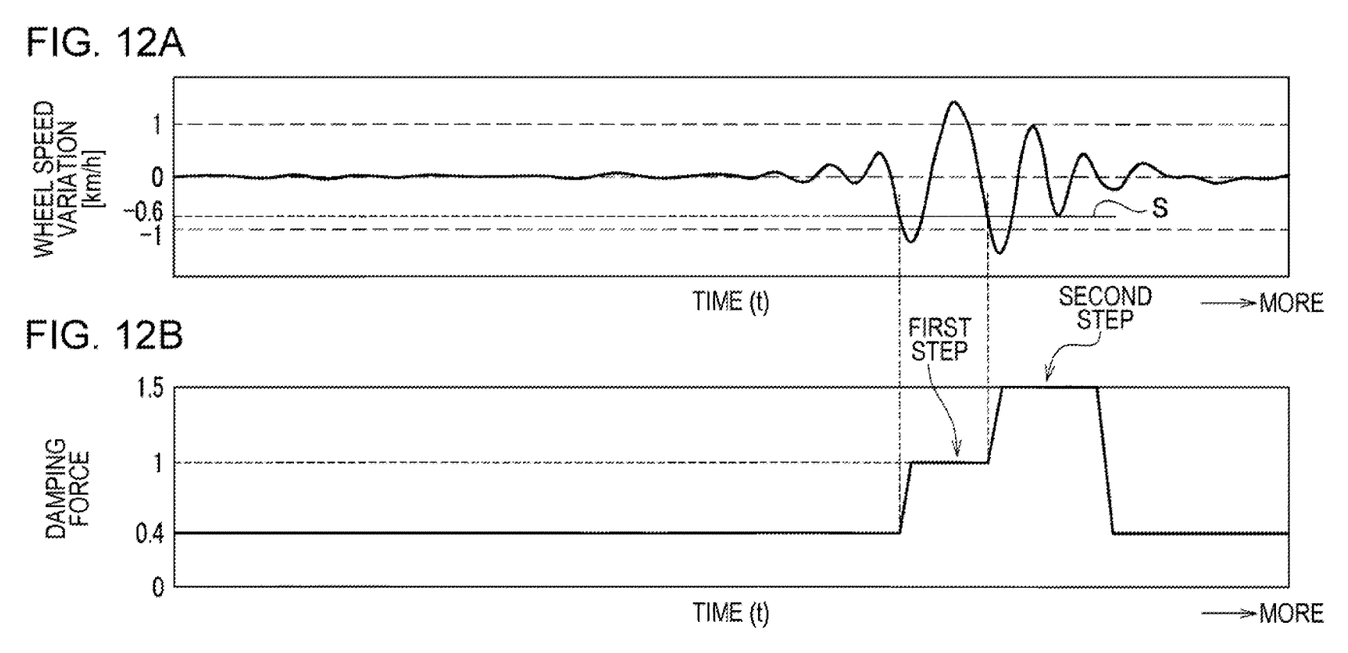
FIGS. 12A and 12B are characteristic diagrams of a fourth example of control of the damping force.

FIGS. 9A and 9B are characteristic diagrams of a first example of control of the damping force, FIGS. 10A and 10B are characteristic diagrams of a second example of control of the damping force, FIGS. 11A and 11B are characteristic diagrams of a third example of control of the damping force, and FIGS. 12A and 12B are characteristic diagrams of a fourth example of control of the damping force.

FIGS. 9A, 10A, 11A, and 12A each are a characteristic diagram of correlations between time (t) indicated by the horizontal axis and wheel speed variations (km/h) indicated by the vertical axis, and FIGS. 9B, 10B, 11B, and 12B each are a characteristic diagram of correlations between time (t) indicated by the horizontal axis and damping force indicated by the vertical axis.

In the first control example, the threshold (predetermined value) S is set at "−0.8", and the control gain G is set at "1.0".

With reference to FIG. 9A, in the first control example, if the wheel speed variation decreases below zero and reaches the threshold S, −0.8, or lower, the minus-side determining unit 64 outputs a control signal to the peak holding unit 56 of the damping force controlling unit 54. The peak holding unit 56 increases the damping force from 0.4 to 1.0 and holds the peak of the damping force at 1.0.

In the first control example, the peak of the damping force is held on the basis of a waveform signal from when the characteristic curve of the wheel speed variation with respect to time reaches the threshold S until when the curve reaches a bottom B being a lower limit value.

That is, the difference (ΔV) in the wheel speed variation between the threshold S and the bottom B below the threshold S is calculated. If ΔV is relatively large, the peak of the damping force to be held is set large. If ΔV is relatively small, the peak of the damping force to be held is set small. FIG. 9B exemplifies the peak of the damping force held at "1".

This control in the first control example stably reduces a shock of full rebound and prevents vibration of the sprung component in landing.

In the second control example, the threshold (predetermined value) S is set at "−0.6". The control gain G is set in correspondence with the difference (ΔV) in the wheel speed variation between the threshold S and a bottom B below the threshold S.

The second control example exemplifies the control gain G set at "1.0". Alternatively, the control gain G may be increased to, for example, "1.2" or "1.5" if the difference (ΔV) in the wheel speed variation between the threshold S and the bottom B is relatively large.

With reference to FIG. 10A, in the second control example, if the wheel speed variation decreases below zero and reaches the threshold S, −0.6, or lower, the minus-side determining unit 64 outputs a control signal to the peak holding period adjusting unit 58 of the damping force controlling unit 54. With reference to FIG. 10B, the peak holding period adjusting unit 58 increases the damping force from 0.4 to 1.0 and holds the peak of the damping force at 1.0 for a predetermined period T from time t1 until time t2. The peak holding period adjusting unit 58 can appropriately adjust the length of the predetermined period T in correspondence with the difference (ΔV) in the wheel speed variation between the threshold S and the bottom B below the threshold S.

If the difference (ΔV) in the wheel speed variation between the threshold S and the bottom B is relatively large, for example, the peak holding period adjusting unit 58 holds the peak for a predetermined period T' from the time t1 until time t3 (see the thick dashed line) (T<T').

Since a large variation in the vertical load on the wheel 16 (a large wheel speed variation) increases the motion of the sprung component (vehicle body 12), this control in the second control example appropriately sets the peak holding period T (T') and/or the control gain G to further prevent vibration of the sprung component (vehicle body 12).

In the third control example, the threshold (predetermined value) S is set at "−0.6". The control gain G is set in correspondence with the difference (ΔV) in the wheel speed variation between the threshold S and a bottom B below the threshold S.

The third control example exemplifies the control gain G set at "1.5". Alternatively, the control gain G may be decreased to "1.2" if the difference (ΔV) in the wheel speed variation between the threshold S and the bottom B is relatively small, or increased to "1.8" if the difference (ΔV) in the wheel speed variation between the threshold S and the bottom B is relatively large.

With reference to FIG. 11A, in the third control example, if the wheel speed variation decreases below zero and reaches the threshold S, −0.6, or lower, the minus-side determining unit 64 outputs a control signal to the control gain adjusting unit 60 of the damping force controlling unit 54. With reference to FIG. 11B, the control gain adjusting unit 60 increases the damping force from 0.4 to 1.5 and holds the peak of the damping force at 1.5. The control gain adjusting unit 60 can appropriately adjust the control gain G in correspondence with an amount (ΔV) of the vertical load decreased.

Since a large variation in the vertical load on the wheel 16 (a large wheel speed variation) increases the motion of the sprung component (vehicle body 12), this control in the third control example appropriately sets the control gain G to further prevent vibration of the sprung component (vehicle body 12).

In the fourth control example, the threshold (predetermined value) S is set constant at "−0.6", and the control gain G is set at "1.0" for the first step and "1.5" for the second step, for example.

In the fourth control example, if the wheel speed variation goes below the threshold S being the predetermined value continuously plural times, the control gain G is increased for the second time (the second step) and after from that for the first time (the first step).

In the fourth control example, if the wheel speed variation decreases below zero and reaches the threshold S, −0.6, or lower for the second time, the minus-side determining unit 64 outputs a control signal to the threshold adjusting unit 62 or the control gain adjusting unit 60 of the damping force controlling unit 54. The control gain adjusting unit 60 increases the damping force from 1.0 for the first time to 1.5 and holds the peak of the damping force at 1.5.

The threshold adjusting unit 62 may adjust the threshold S for the second time relative to the threshold S for the first time. FIG. 12B exemplifies the control gain G increased for the second step from that for the first step.

If the wheel speed variation goes below the threshold S being the predetermined value continuously plural times, the damping force for the first time (the first step) can be controlled by increasing the control gain G or adjusting the threshold S for prompt control for the second time (the second step) and after, assuming that a reduction in a shock of full rebound is insufficient. This control in the fourth control example can effectively reduce a shock of full rebound and prevent vibration of the sprung component in landing.

The first to fourth examples should not be construed to limit examples of control of the damping force and may be appropriately combined, for example.

What is claimed is:

1. A suspension controller installed in a vehicle, comprising:
    a damping-force-variable damper capable of generating and adjusting damping force in response to an input signal to the damper;
    a wheel speed sensor that detects wheel speed of a wheel of the vehicle;
    a basic input amount calculator configured to calculate a basic input amount of the vehicle on the basis of a wheel speed variation of the wheel speed detected by the wheel speed sensor;
    a state amount calculator configured to calculate a state amount of the vehicle by inputting the basic input amount to a predetermined vehicle model representing motion of the vehicle; and
    a damper controller configured to control the damping force of the damping-force-variable damper on the basis of the calculated state amount, wherein
    if the damper controller detects that the wheel speed variation detected by the wheel speed sensor decreases below zero by a predetermined value or more on a minus side, the damper controller increases the damping force to be greater than before the decrease in the wheel speed variation,
    the damper controller detects the damping force as a waveform signal, and
    if the damper controller detects that the wheel speed variation goes below a threshold being the predetermined value from zero on the minus side, the damping force is held at a peak of the waveform signal having a bottom that goes below the threshold, and
    the damper controller adjusts a period for the holding of the peak in correspondence with a portion of an amount of the wheel speed variation that goes below the threshold.

2. The suspension controller according to claim 1, wherein
    the damper controller adjusts a control gain in correspondence with a portion of an amount of the wheel speed variation that goes below a threshold being the predetermined value from zero on the minus side.

3. A suspension controller installed in a vehicle, comprising:

a damping-force-variable damper capable of generating and adjusting damping force in response to an input signal to the damper;

a wheel speed sensor that detects wheel speed of a wheel of the vehicle;

a basic input amount calculator configured to calculate a basic input amount of the vehicle on the basis of a wheel speed variation of the wheel speed detected by the wheel speed sensor;

a state amount calculator configured to calculate a state amount of the vehicle by inputting the basic input amount to a predetermined vehicle model representing motion of the vehicle; and a damper controller configured to control the damping force of the damping-force-variable damper on the basis of the calculated state amount, wherein if the damper controller detects that the wheel speed variation detected by the wheel speed sensor decreases below zero by a predetermined value or more on a minus side, the damper controller increases the damping force to be greater than before the decrease in the wheel speed variation, wherein if the damper controller detects that the wheel speed variation goes below a threshold being the predetermined value from zero on the minus side continuously plural times which includes a first time detection and a second time detection after the first time detection, the threshold for the second time detection and later detections is adjusted relative to the threshold for the first time detection, or a control gain is increased for the second time detection and later detections from a control gain for the first time detection.

* * * * *